(12) United States Patent
Chien et al.

(10) Patent No.: US 11,385,652 B2
(45) Date of Patent: Jul. 12, 2022

(54) METHOD OF CONTROLLING MOTION OF MOBILE WARNING TRIANGLE AND MOBILE WARNING TRIANGLE EMPLOYING METHOD

(71) Applicant: Fulian Precision Electronics (Tianjin) Co., Ltd., Tianjin (CN)

(72) Inventors: Yu-Ching Chien, New Taipei (TW); Chuang-Wei Tseng, New Taipei (TW)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 38 days.

(21) Appl. No.: 17/018,362

(22) Filed: Sep. 11, 2020

(65) Prior Publication Data

US 2021/0149410 A1 May 20, 2021

(30) Foreign Application Priority Data

Nov. 18, 2019 (CN) .......................... 201911128393.3

(51) Int. Cl.
*G05D 1/02* (2020.01)
*G06V 10/56* (2022.01)
*G06V 20/56* (2022.01)

(52) U.S. Cl.
CPC ......... *G05D 1/0234* (2013.01); *G05D 1/0246* (2013.01); *G06V 10/56* (2022.01); *G06V 20/588* (2022.01)

(58) Field of Classification Search
CPC ............... G05D 1/0234; G05D 1/0246; G05D 2201/0213; G06V 10/56; G06V 20/588; B60Q 7/00
See application file for complete search history.

(56) References Cited

U.S. PATENT DOCUMENTS

| | | | | |
|---|---|---|---|---|
| 9,902,317 | B1* | 2/2018 | Chuang | B60Q 1/52 |
| 11,254,308 | B2* | 2/2022 | Oka | G08G 1/16 |
| 2002/0154947 | A1* | 10/2002 | Farritor | E01F 9/654 |
| | | | | 404/9 |
| 2013/0028473 | A1 | 1/2013 | Hilldore | |
| 2015/0073623 | A1* | 3/2015 | Zhang | G09F 13/16 |
| | | | | 701/2 |
| 2015/0336510 | A1 | 11/2015 | Imai et al. | |
| 2016/0202077 | A1* | 7/2016 | Huang | G06V 20/58 |
| | | | | 701/540 |
| 2018/0307234 | A1 | 10/2018 | Zhu et al. | |

* cited by examiner

*Primary Examiner* — Thomas Ingram
(74) *Attorney, Agent, or Firm* — ScienBiziP, P.C.

(57) ABSTRACT

A method for controlling a mobile warning triangle to move along a lane marking controls the mobile warning triangle to move forward and acquire color information of the lane marking detected by a first sensor and a second sensor of the mobile warning triangle when the mobile warning triangle is placed to allow the first sensor to detect the lane marking of the lane. The color information detected by the first sensor is recognized or not recognized as a color of the lane marking, if yes, controlling the mobile warning triangle to continue moving forward. If not recognized, determining whether the color information detected by the second sensor is the color of the lane marking and if yes, correcting a moving direction of the mobile warning triangle to a first direction by a first predetermined angle or repetitions of the predetermined angle to continue moving forward.

20 Claims, 10 Drawing Sheets

METHOD OF CONTROLLING MOTION OF MOBILE WARNING TRIANGLE AND MOBILE WARNING TRIANGLE EMPLOYING METHOD

FIELD

The subject matter herein generally relates to road safety.

BACKGROUND

A warning triangle raised at a distance from a broken-down car warns other vehicles of an obstruction or other danger ahead. A mobile warning triangle in motion towards a point of warning may deviate from a correct path.

BRIEF DESCRIPTION OF THE DRAWINGS

Implementations of the present technology will now be described, by way of example only, with reference to the attached figures.

DETAILED DESCRIPTION

Figure 1:
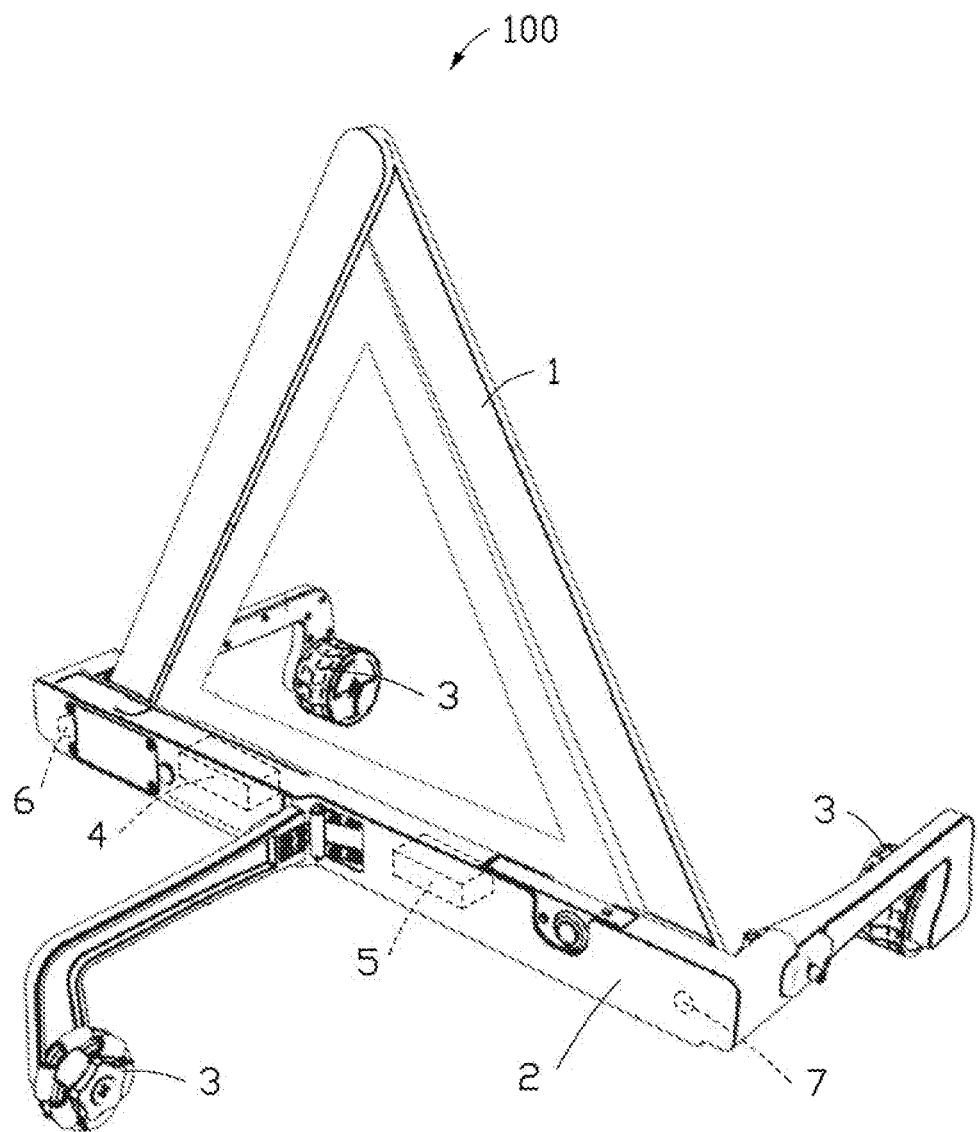
FIG. 1 is a diagram of an exemplary embodiment of a mobile warning triangle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a mobile warning triangle 100 in accordance with an exemplary embodiment.

The mobile warning triangle 100 comprises a warning triangle 1, a base 2, three wheels 3, a control device 4, a motor 5, a first sensor 6, and a second sensor 7. The control device 4 can guide the mobile warning triangle 100 to move forward along the lane marking. The control device 4 can further correct a moving direction of the mobile warning triangle 100.

The mobile warning triangle 100 is raised at a first predetermined distance from a stationary car or another road impediment. The first predetermined distance can be 100 meters or 150 meters for example.

The first sensor 6 and the second sensor 7 can be color-sensitive sensors. For example, the first sensor 6 and the second sensor 7 are TCS3200 color sensors. In the TCS3200 color sensor, if a color filter is selected, only a primary color corresponding to the color filter is allowed to pass, and other primary colors are blocked. If a red filter is selected, the red light of incident light can pass, blue light and green light of the incident light are blocked, and an light intensity of the red light can be obtained. Similarly, by selecting other filters, an intensity of blue light can be obtained, and an intensity of green light can be obtained as required. Then, the color and intensity of the light incident on the TCS3200 color sensor can be recognized.

In one embodiment, the first sensor 6 and the second sensor 7 can be installed at the bottom of the mobile warning triangle 100, such as the bottom of the base 2, to better detect a lane marking. For example, when the mobile warning triangle 100 is moving, directions of detection of the first sensor 6 and the second sensor 7 are downward to detect the lane marking.

In one embodiment, three or more sensors can be installed at the bottom of the mobile warning triangle 100, the number of sensors can be installed according to an actual application.

Figure 2:
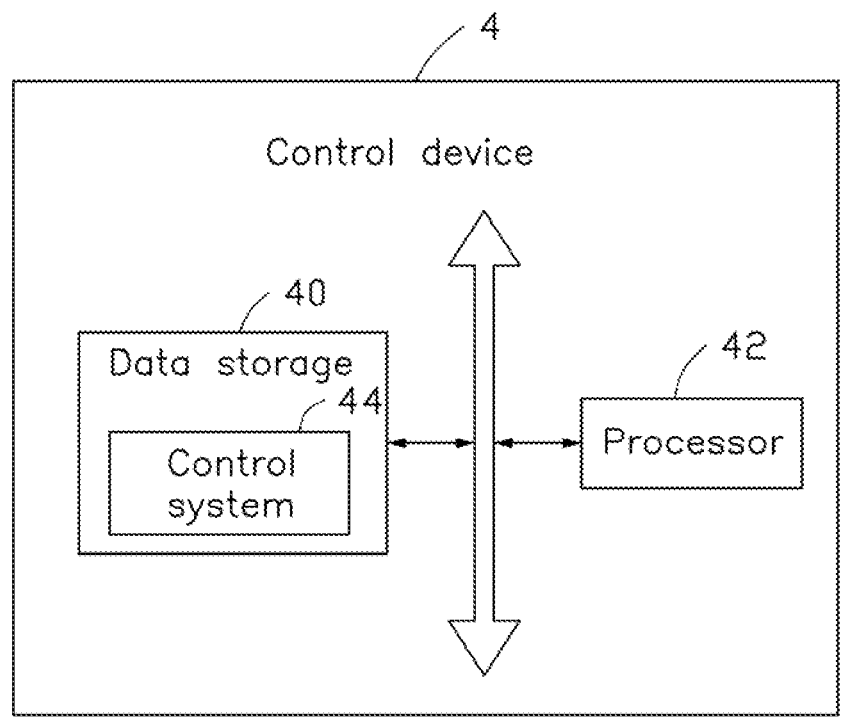
FIG. 2 is a block diagram of an exemplary embodiment of a control device of the mobile warning triangle.

Referring to FIG. 2, the control device 4 can comprise at least one data storage 40, at least one processor 42, and a control system 44.

In one embodiment, the data storage 40 can be in the mobile warning triangle 100, or can be a separate external memory card, such as an SM card (Smart Media Card), an SD card (Secure Digital Card), or the like. The data storage 40 can include various types of non-transitory computer-readable storage mediums. For example, the data storage 40 can be an internal storage system, such as a flash memory, a random access memory (RAM) for the temporary storage of information, and/or a read-only memory (ROM) for permanent storage of information. The data storage 40 can also be an external storage system, such as a hard disk, a storage card, or a data storage medium. The processor 42 can be a central processing unit (CPU), a microprocessor, or other data processor chip that performs functions of the mobile warning triangle 100.

Figure 3:
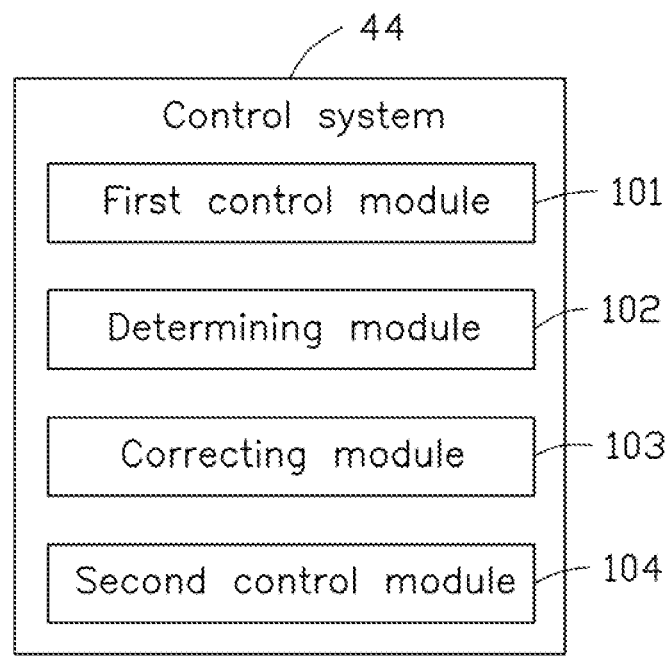
FIG. 3 is a block diagram of an exemplary embodiment of a control system of the control device.

FIG. 3 illustrates the control system 44 as comprising a plurality of modules, such as a first control module 101, a determining module 102, a correcting module 103, and a second control module 104. The modules 101-104 can comprise one or more software programs in the form of computerized codes stored in the data storage 40. The computerized codes can include instructions that can be executed by the processor 42 to provide functions for the modules 101-104.

As shown in FIG. 1, the mobile warning triangle 100 comprises the first sensor 6 and the second sensor 7 as an example. The first sensor 6 and the second sensor 7 are arranged at the ends of the bottom of the mobile warning triangle 100.

Figure 4A:
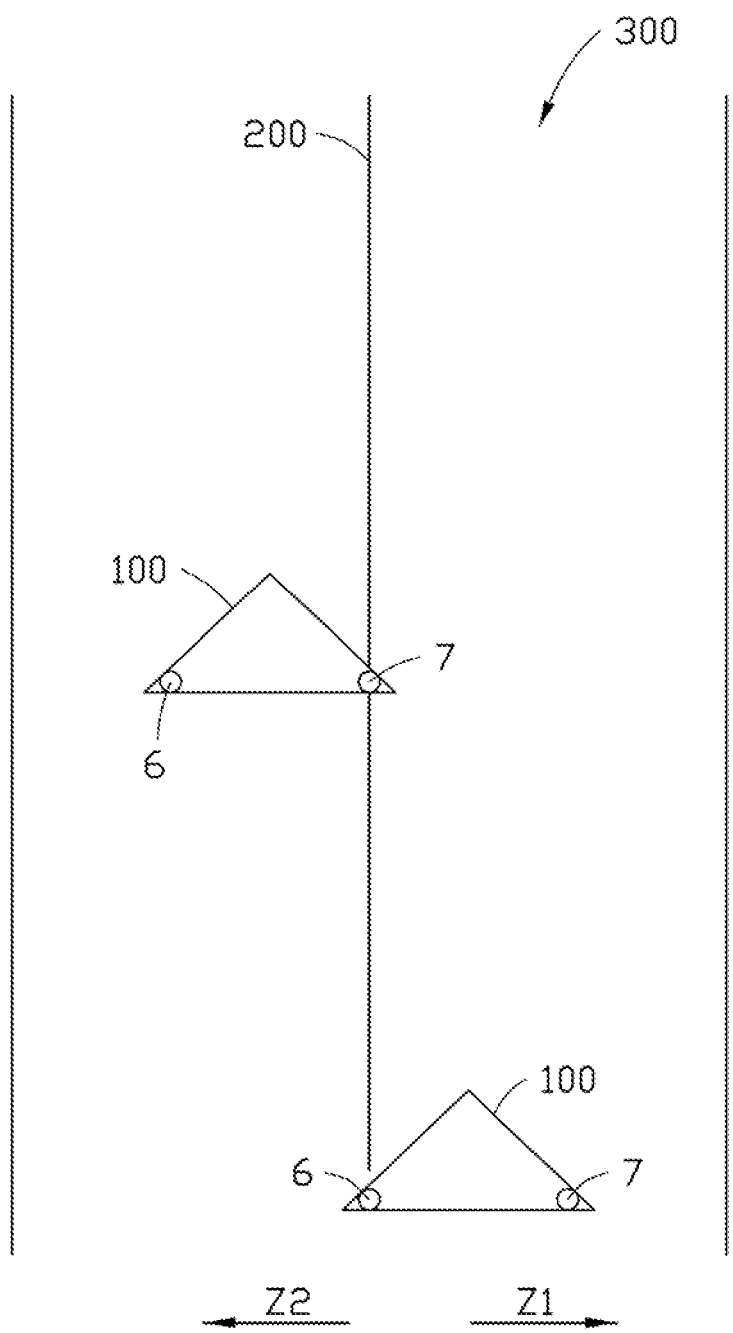
FIGS. 4a-4c are diagrams of an exemplary embodiment of the mobile warning triangle in motion along a lane with two sensors working.

The first control module 101 can control the mobile warning triangle 100 to move forward or backward and when the mobile warning triangle 100 is placed on a lane 300 (as shown in FIG. 4a) of a road or other traversable surface the first sensor 6 and second sensor 7 can detect the lane marking 200 (as shown in FIG. 4a), the first sensor 6 can acquire color information (first color information) and the second sensor 7 can acquire color information (second color information).

In one embodiment, the lane markings 200 of the load are white markings or are yellow markings. Along an expressway or a provincial highway, the lane markings 200 are white markings and yellow markings, while the road itself is black. There is a significant difference in color between the road and the lane markings 200. The first sensor 6 and the second sensor 7 can easily detect the lane markings 200. When a vehicle is considered to be an obstacle on the road, the mobile warning triangle 100 is raised at the first predetermined distance from the stationary vehicle to warn other vehicles. A user can place the mobile warning triangle 100 on the lane 300 in which the vehicle is stationary, and aim the first sensor 6 at the lane marking 200 of the lane 300 (for example a white marking). The first sensor 6 can detect the lane marking 200 to control the mobile warning triangle 100 to move forward along the lane marking 200. When the mobile warning triangle 100 is placed on the lane 300 and the first sensor 6 detects the lane marking 200 of the lane 300, the first control module 101 controls the mobile warning triangle 100 to move forward. When the mobile warning triangle 100 is moving, the first control module 101 can obtain the first color information and the second color information detected by the first sensor 6 and the second sensor 7 respectively in real time to determine a lane departure by the mobile warning triangle 100.

In one embodiment, an installation distance between the first sensor 6 and the second sensor 7 is set and detection angles of the two sensors 6 and 7 are limited. Then, the first sensor 6 and the second sensor 7 cannot simultaneously detect the same lane marking 200.

The determining module 102 determines whether the first color information detected by the first sensor 6 is the color of the lane marking 200.

In one embodiment, when the first control module 101 obtains the first color information detected by the first sensor 6 and the second color information detected by the second sensor 7, the determining module 102 can determine whether the first color information detected by the first sensor 6 is the color of the lane marking 200.

In one embodiment, when the determining module 102 determines that the first color information detected by the first sensor 6 is the color of the lane marking 200, the mobile warning triangle 100 is deemed to be still moving forward along the lane marking 200. There is no lane departure or deviation of the mobile warning triangle 100, and the first control module 101 controls the mobile warning triangle 100 to continue moving forward. When the first color information detected by the first sensor 6 is not the color of the lane marking 200, the determining module 102 further determines whether the second color information detected by the second sensor 7 is the color of the lane marking 200.

In one embodiment, when the determining module 102 determines that the first color information detected by the first sensor 6 is not the color of the lane marking 200, a deviation may be indicated. As shown in FIG. 4a, when the mobile warning triangle 100 is not moving forward along the lane marking 200, it is necessary to determine a deviation in a direction of the mobile warning triangle 100. For example, the deviation in the direction of the mobile warning triangle 100 can be determined based on a result of determining whether the second color information detected by the second sensor 7 is the color of the lane marking 200.

Figure 4B:
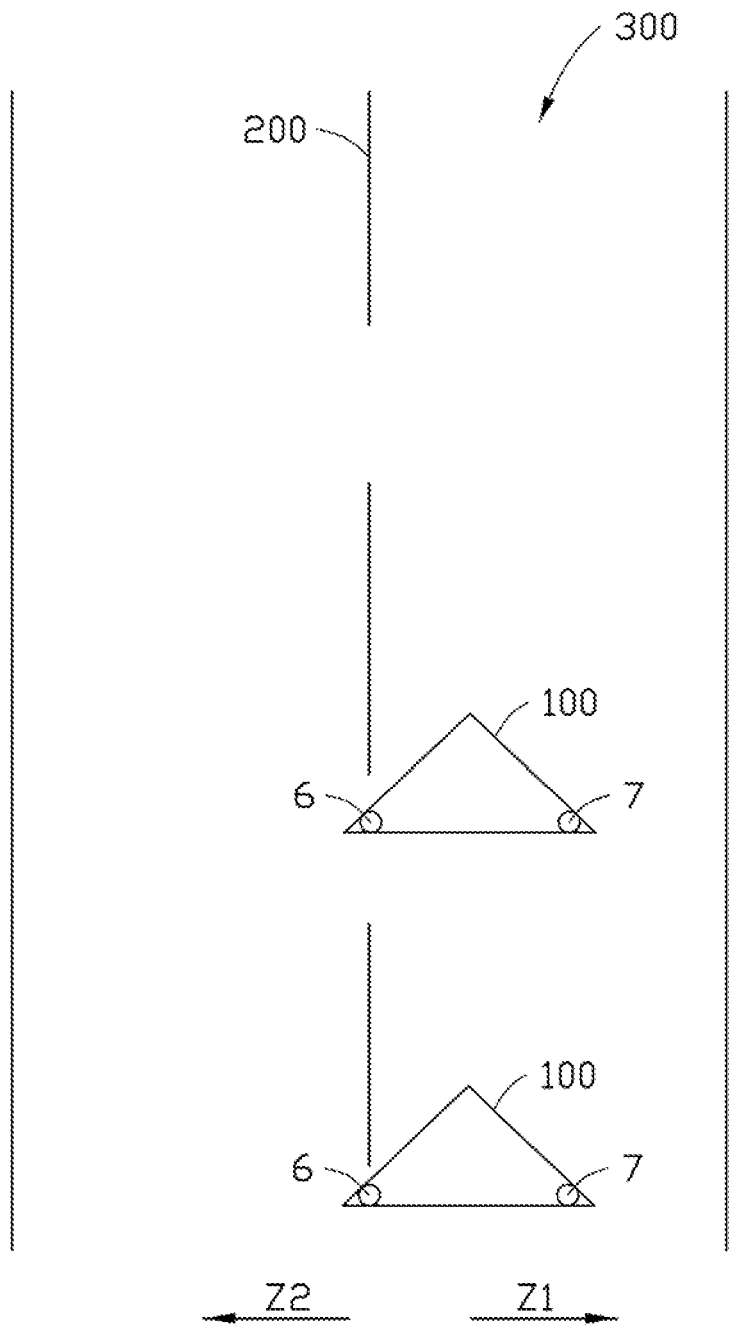

In other embodiment, as shown in FIG. 4b, when the lane marking 200 comprises a dashed part and the determining module 102 determines that the first color information detected by the first sensor 6 is not the color of the lane marking, the mobile warning triangle 100 may still move forward along the lane marking 200 (the mobile warning triangle 100 is moving in an unmarked area).

When the second color information detected by the second sensor 7 is the color of the lane marking 200, the correcting module 103 corrects the moving direction of the mobile warning triangle 100 to a first direction Z1 by a first predetermined angle and the first control module 101 controls the mobile warning triangle 100 to continue moving forward.

In one embodiment, when the second color information detected by the second sensor 7 is the color of the lane marking 200, this is taken as an indication that the mobile warning triangle 100 is deviating to an outside of the lane 300 (as shown in FIG. 4a), and the correcting module 103 can correct the moving direction of the mobile warning triangle 100 to the first predetermined angle toward the first direction Z1 to continue moving forward. A value of the first predetermined angle can be defined based on the actual application. For example, the first predetermined angle is 10 degrees.

When the mobile warning triangle 100 deviates to the outside of the lane 300, the correcting module 103 corrects the moving direction of the mobile warning triangle 100 to the first predetermined angle toward the first direction Z1 to continue moving forward. When the first sensor 6 detects the lane marking again, it indicates that the current direction correction of the mobile warning triangle 100 is correct. When the mobile warning triangle 100 moves a second predetermined distance and the first sensor 6 fails to detect the lane marking 200 again, it indicates that the current direction correction of the mobile warning triangle 100 is incorrect, and the moving direction of the mobile warning triangle 100 needs to be corrected again. The correcting module 103 performs a direction correction of a reverse mode on the mobile warning triangle 100. In the reverse mode, the current correction method of the mobile warning triangle 100 is opposite to the last correction method.

In one embodiment, if the correcting module 103 performs the direction correction of the reverse mode on the mobile warning triangle 100 and the mobile warning triangle 100 moves a third predetermined distance, and the first sensor 6 still fails to detect the lane marking 200 during the third predetermined distance, the second control module 104 controls the mobile warning triangle 100 to stop moving.

For example, the last correction method is to correct the moving direction of the mobile warning triangle 100 to the first predetermined angle toward the first direction Z1. The correcting module 103 performing the direction correction of the reverse mode on the mobile warning triangle 100 comprises the correcting module 103 correcting the moving direction of the mobile warning triangle 100 twice in the first predetermined angle toward a second direction Z2. An included angle between the first direction Z1 and the second direction Z2 is 180 degrees.

In one embodiment, the second predetermined distance is greater than or equal to a distance of the interruption between two dashed markings of the dashed part. For example, the interruption distance between the two dashed markings of the dashed part is 6 meters, the second predetermined distance can be defined as 7 meters. Correction of the mobile warning triangle 100 to the wrong direction can be avoided when the mobile warning triangle 100 moves in the interruption between the two dashed markings of the dashed part.

Figure 4C:
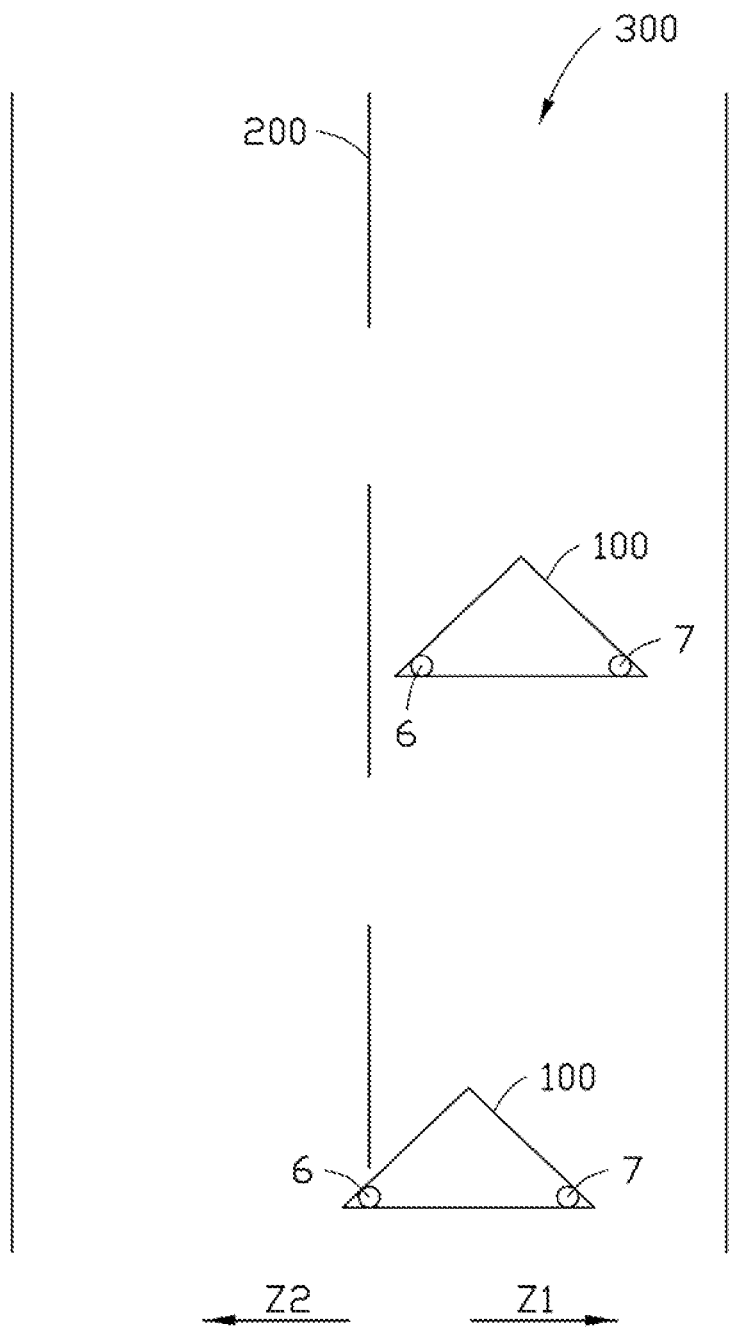

In one embodiment, when the second color information detected by the second sensor 7 is not the color of the lane marking 200, it may indicate that the mobile warning triangle 100 deviates to the inside of the lane 300, and neither the first color information detected by the first sensor 6 nor the second color information detected by the second sensor 7 are the color of the lane marking 200. As shown in FIG. 4c, the correcting module 103 can correct the moving direction of the mobile warning triangle 100 to the second direction Z2 by a second predetermined angle to continue moving forward. A value of the second predetermined angle can be defined based on the actual application. For example, the second predetermined angle is 15 degrees.

In one embodiment, when the mobile warning triangle 100 deviates to the inside of the lane 300, the correcting module 103 corrects the moving direction of the mobile warning triangle 100 to the second predetermined angle toward the second direction Z2 to continue moving forward, the first sensor 6 detects the lane marking 200 again, it may indicate that the current direction correction of the mobile warning triangle 100 is correct. When the mobile warning triangle 100 moves the second predetermined distance and the first sensor 6 still fails to detect the lane marking 200 again, it may indicate that the current direction correction of the mobile warning triangle 100 is incorrect, the moving direction of the mobile warning triangle 100 needs to be corrected again, and the correcting module 103 can perform the direction correction of the reverse mode on the mobile warning triangle 100.

For example, the last correction method is to correct the moving direction of the mobile warning triangle 100 to the second predetermined angle toward the second direction Z2, and the correcting module 103 performing the direction correction of the reverse mode on the mobile warning triangle 100 is that the correcting module 103 corrects the moving direction of the mobile warning triangle 100 twice of the second predetermined angle toward the first direction Z1.

The second control module 104 controls the mobile warning triangle 100 to stop moving when a moving distance of the mobile warning triangle 100 is equal to a predetermined moving distance.

In one embodiment, when the moving distance of the mobile warning triangle 100 is equal to the predetermined moving distance, it may indicate that the mobile warning triangle 100 has moved to a suitable distance behind the vehicle, and the second control module 104 can control the mobile warning triangle 100 to stop moving. The predetermined moving distance can be set according to the actual application, for example, the predetermined moving distance is set to 150 meters.

In one embodiment, the mobile warning triangle 100 can support a manual method or an application (APP) mode to define the predetermined moving distance.

In one embodiment, when the moving distance of the mobile warning triangle 100 is equal to the predetermined moving distance, the second control module 104 can control the mobile warning triangle 100 to move a second distance toward the first direction Z1 and then stop moving. Then, the mobile warning triangle 100 can be positioned in a middle area of the lane 300 to have an effective warning function. The second distance can be set according to the actual application, for example, the second distance is 1.5 meters.

Figure 5:
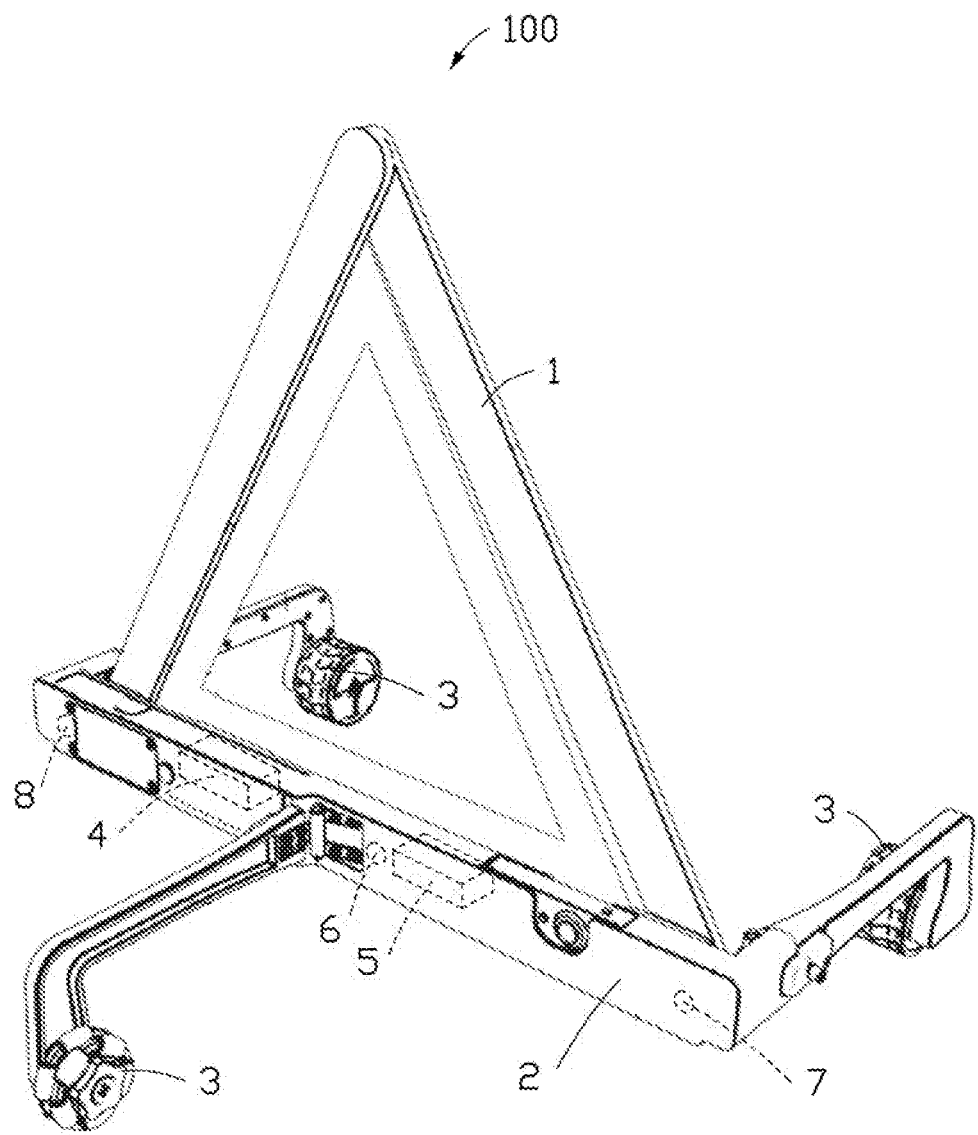
FIG. 5 is a diagram of another exemplary embodiment of the mobile warning triangle.

As shown in FIG. 5, the mobile warning triangle 100 comprises the first sensor 6, the second sensor 7, and a third sensor 8 as an example. The second sensor 7 and the third sensor 8 are at the ends of the bottom of the mobile warning triangle 100. The first sensor is arranged between the second sensor 7 and the third sensor 8. For example, the first sensor 6 is arranged in the middle position between the second sensor 7 and the third sensor 8.

Figure 6A:
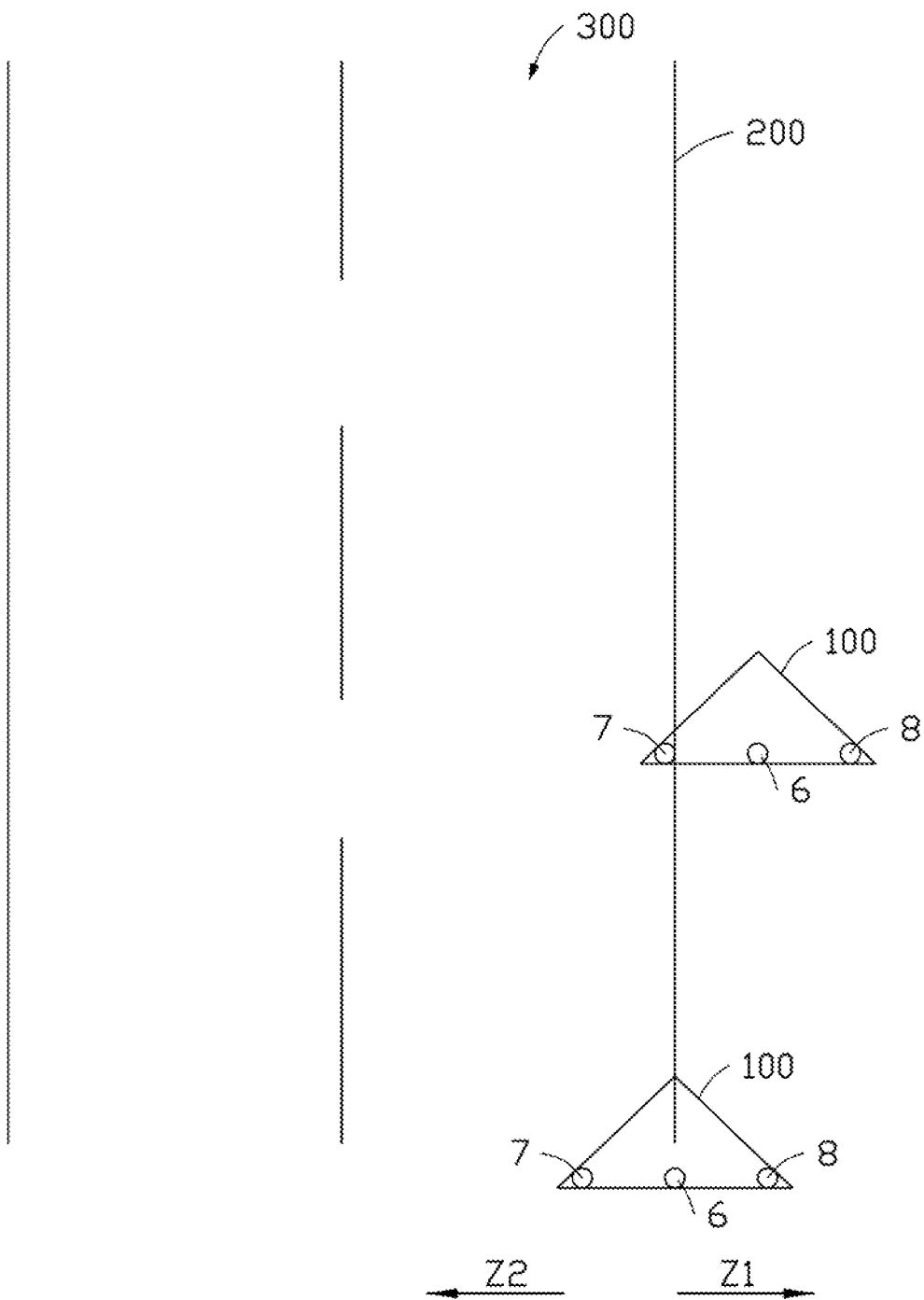
FIGS. 6a-6b are diagrams of an exemplary embodiment of the mobile warning triangle in motion along a lane with three sensors working.

The first control module 101 controls the mobile warning triangle 100 to move forward and acquire the first color information detected by the first sensor 6, the second color information detected by the second sensor 7, and the third color information detected by the third sensor 8 when the mobile warning triangle 100 is placed on the lane 300 (as shown in FIG. 6a) and the first sensor 6 detects the lane marking 200 (as shown in FIG. 6a).

In one embodiment, when the vehicle is stationary, the mobile warning triangle 100 is raised at the first predetermined distance from the stationary vehicle to warn other vehicles. The user can place the mobile warning triangle 100 on the lane 300 where the vehicle is stopped, and aim the first sensor 6 at the lane marking 200 of the lane 300. The first sensor 6 can detect the lane marking 200 to control the mobile warning triangle 100 to move forward along the lane marking 200. When the mobile warning triangle 100 is placed on the lane 300 and the first sensor 6 detects the lane marking 200 of the lane 300, the first control module 101 controls the mobile warning triangle 100 to move forward. When the mobile warning triangle 100 is moving, the first control module 101 can obtain the first color information detected by the first sensor 6, the second color information detected by the second sensor 7, and the third color information detected by the third sensor 8 in real time to determine whether the mobile warning triangle 100 is deviating from a correct path.

In one embodiment, a first installation distance between the first sensor 6 and the second sensor 7 and a second installation distance between the first sensor 6 and the third sensor 8 are set and detection angles of the three sensors 6, 7, and 8 are limited. Then, the first sensor 6, the second sensor 7, and the third sensor 8 cannot simultaneously detect the same lane marking 200.

The determining module 102 determines whether the first color information detected by the first sensor 6 is the color of the lane marking 200.

In one embodiment, when the first control module 101 obtains the first color information detected by the first sensor 6, the second color information detected by the second sensor 7, and the third color information detected by the third sensor 8, the determining module 102 can determine whether the first color information detected by the first sensor 6 is the color of the lane marking 200.

In one embodiment, when the determining module 102 determines that the first color information detected by the first sensor 6 is the color of the lane marking 200, it may indicate that the mobile warning triangle 100 is still moving forward along the lane marking 200, and that no lane departure or deviation is occurring. The first control module 101 controls the mobile warning triangle 100 to continue moving forward. When the first color information detected by the first sensor 6 is not the color of the lane marking 200, the determining module 102 further determines whether the second color information detected by the second sensor 7 is the color of the lane marking 200.

In one embodiment, when the determining module 102 determines that the first color information detected by the first sensor 6 is not the color of the lane marking 200, it may indicate that the mobile warning triangle 100 may not be moving forward along the lane marking 200 currently. It is necessary to determine the deviation in a direction of the mobile warning triangle 100. For example, the deviation in the direction of the mobile warning triangle 100 can be determined based on a result of determining whether the second color information detected by the second sensor 7 is the color of the lane marking 200 and a result of determining whether the third color information detected by the third sensor 8 is the color of the lane marking 200.

Because the first sensor 6 is arranged between the second sensor 7 and the third sensor 8, an initial detection state is that the first sensor 6 can detect the lane marking 200. When the determining module 102 determines that the first color information detected by the first sensor 6 is not the color of the lane marking 200, either the second sensor 7 or the third sensor 8 can detect the lane marking 200.

As shown in FIG. 6a, when the second color information detected by the second sensor 7 is the color of the lane marking 200, the correcting module 103 corrects the moving direction of the mobile warning triangle 100 to the second direction Z2 by a third predetermined angle and the first control module 101 controls the mobile warning triangle 100 to continue moving forward.

In one embodiment, when the second color information detected by the second sensor 7 is the color of the lane marking 200, it may indicate that the mobile warning triangle 100 is deviating to an outside of the lane 300 (as shown in FIG. 6a), and the correcting module 103 can correct the moving direction of the mobile warning triangle 100 to the third predetermined angle toward the second direction Z2 to continue moving forward. A value of the third predetermined angle can be defined based on the actual application. For example, the third predetermined angle is 10 degrees.

When the mobile warning triangle 100 deviates to the outside of the lane 300, the correcting module 103 corrects the moving direction of the mobile warning triangle 100 by the third predetermined angle toward the second direction Z2 to continue moving forward, the first sensor 6 detects the lane marking 200 again, and this may indicate that the current direction correction of the mobile warning triangle 100 is correct. When the mobile warning triangle 100 moves the second predetermined distance and the first sensor 6 still fails to detect the lane marking 200, it may indicate that the current direction correction of the mobile warning triangle 100 is incorrect, and the moving direction of the mobile warning triangle 100 needs to be corrected again. The correcting module 103 can perform the direction correction of the reverse mode on the mobile warning triangle 100.

For example, the last correction method is to correct the moving direction of the mobile warning triangle 100 to the third predetermined angle toward the second direction Z2, and the correcting module 103 performing the direction correction of the reverse mode on the mobile warning triangle 100 is that the correcting module 103 applies the third predetermined angle twice to correct the moving direction of the mobile warning triangle 100 toward the first direction Z1.

When the second color information detected by the second sensor 7 is not the color of the lane marking 200, the determining module 102 determines whether the third color information detected by the third sensor 8 is the color of the lane marking 200.

Figure 6B:
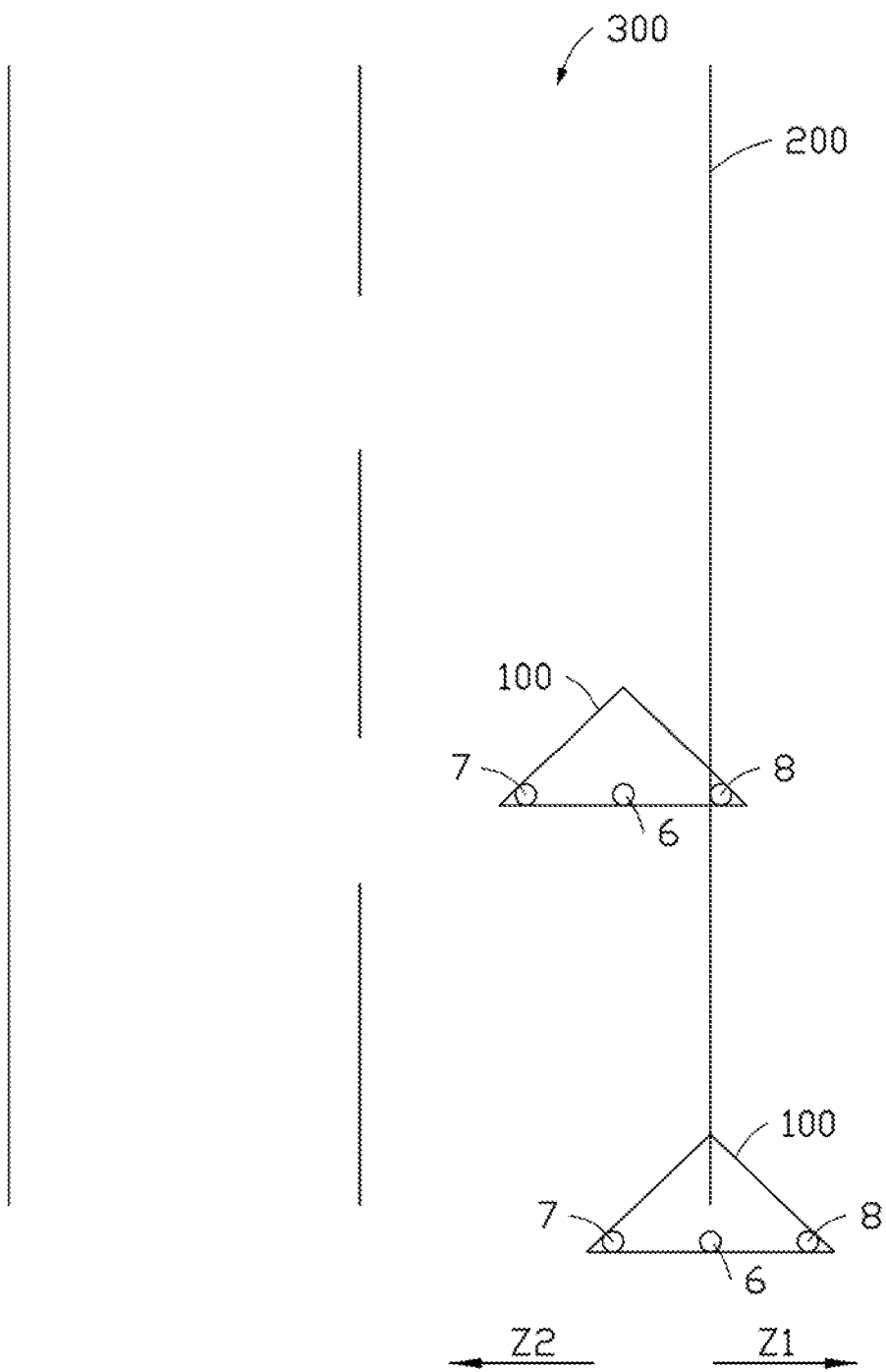

In one embodiment, when the third color information detected by the third sensor 8 is the color of the lane marking 200, it may indicate that the mobile warning triangle 100 is deviating to the inside of the lane 300. As shown in FIG. 6b, the correcting module 103 can correct the moving direction of the mobile warning triangle 100 to the first direction Z1 by a fourth predetermined angle to continue moving forward. A value of the fourth predetermined angle can be defined based on the actual application. For example, the fourth predetermined angle is 10 degrees.

In one embodiment, when the mobile warning triangle 100 deviates to the inside of the lane 300, the correcting module 103 corrects the moving direction of the mobile warning triangle 100 to the fourth predetermined angle toward the first direction Z1 to continue moving forward, the first sensor 6 detects the lane marking 200 again, it may indicate that the current direction correction of the mobile warning triangle 100 is correct. When the mobile warning triangle 100 moves the second predetermined distance and the first sensor 6 still fails to detect the lane marking 200 again, it may indicate that the current direction correction of the mobile warning triangle 100 is incorrect. The moving direction of the mobile warning triangle 100 needs further correction, and the correcting module 103 can perform the direction correction of the reverse mode on the mobile warning triangle 100.

For example, the last correction method is to correct the moving direction of the mobile warning triangle 100 to the fourth predetermined angle toward the first direction Z1, and the correcting module 103 performing the direction correction of the reverse mode on the mobile warning triangle 100 is that the correcting module 103 applies the third predetermined angle twice to correct the moving direction of the mobile warning triangle 100 toward the second direction Z2.

When the third color information detected by the third sensor 8 is not the color of the lane marking 200, it may indicate that the mobile warning triangle 100 is moving in the unmarked area of the dashed part of the lane marking 200. The first control module 101 controls the mobile warning triangle 100 to move the second predetermined distance. If the first sensor 6 detects the lane marking 200 again during the second predetermined distance, the first control module 101 can control the mobile warning triangle 100 to continue to move forward. If the first sensor 6 fails to detect the lane marking 200 again during the second predetermined distance, it may indicate that the first to third sensors 6 to 8 may be in abnormal states. The second control module 104 can control the mobile warning triangle to stop moving and output a predetermined prompt to inform the user that the mobile warning triangle 100 is abnormal. The predetermined prompt can be outputted by the mobile warning triangle 100 or by an APP which is communicating with the mobile warning triangle 100.

The second control module 104 controls the mobile warning triangle 100 to stop moving when the moving distance of the mobile warning triangle 100 is equal to the predetermined moving distance.

In one embodiment, when the moving distance of the mobile warning triangle 100 is equal to the predetermined moving distance, it may indicate that the mobile warning triangle 100 has moved to the suitable distance behind the vehicle, and the second control module 104 can control the mobile warning triangle 100 to stop moving.

In one embodiment, when the moving distance of the mobile warning triangle 100 is equal to the predetermined moving distance, the second control module 104 can control the mobile warning triangle 100 to move the second distance toward the second direction Z2 and then stop moving. Then, the mobile warning triangle 100 can be positioned in the middle area of the lane 300 to have a good warning effect.

Figure 7:
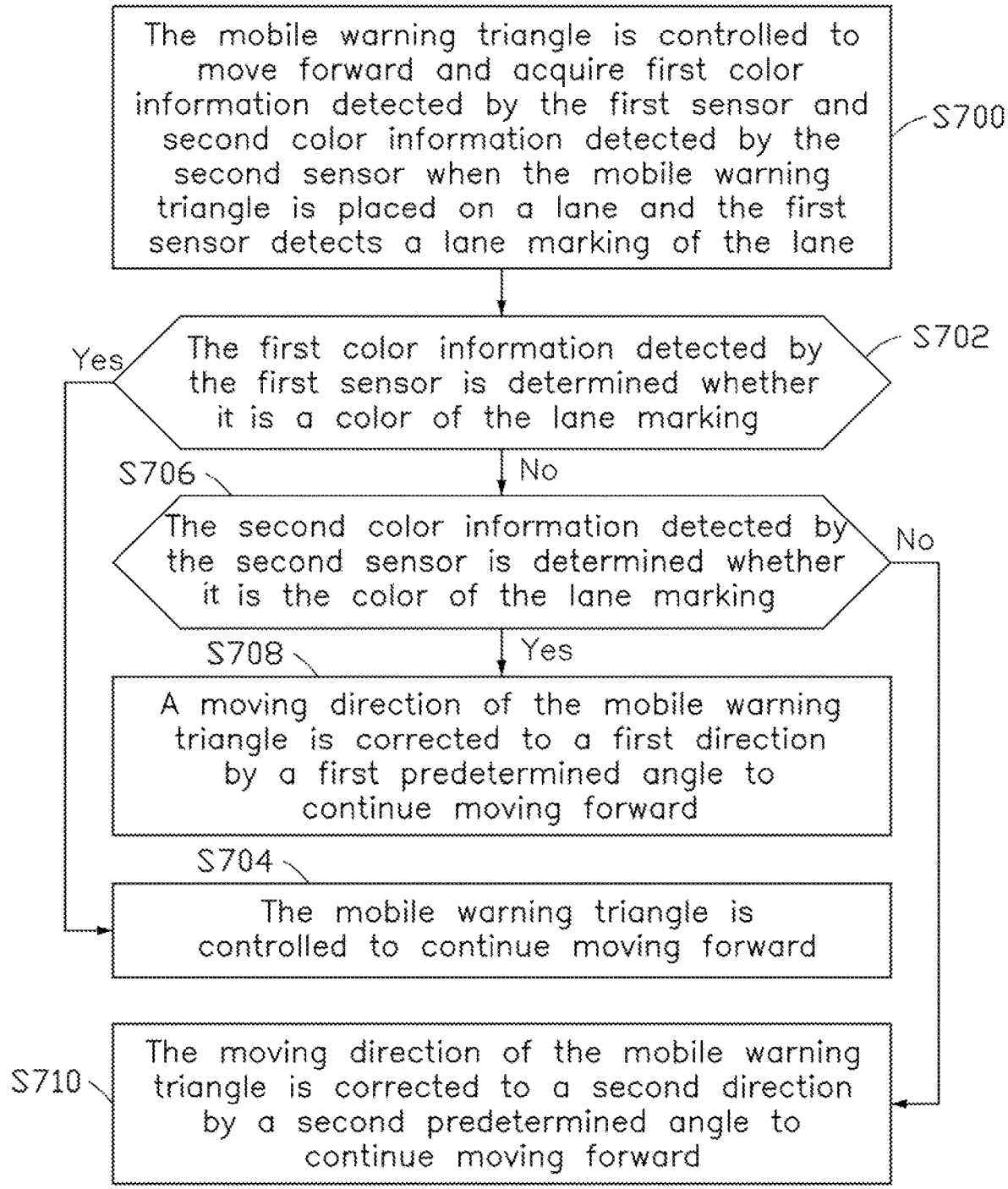
FIG. 7 is a flow diagram of a method in one embodiment of a driving control of the mobile warning triangle.

FIG. 7 illustrates one exemplary embodiment of a driving control method of the mobile warning triangle 100. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each step shown in FIG. 7 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 700.

In block 700, the mobile warning triangle 100 is controlled to move forward and acquire first color information detected by the first sensor 6 and second color information detected by the second sensor 7 when the mobile warning triangle 100 is placed on a lane 300 and the first sensor 6 detects a lane marking 200 of the lane 300.

In block 702, the first color information detected by the first sensor 6 is determined whether it is a color of the lane marking 200.

In block 704, the mobile warning triangle 100 is controlled to continue moving forward when the first color information detected by the first sensor 6 is the color of the lane marking 200.

In block 706, the second color information detected by the second sensor 7 is determined whether it is the color of the lane marking 200 when the first color information detected by the first sensor 6 is not the color of the lane marking 200.

In block 708, a moving direction of the mobile warning triangle 100 is corrected to a first direction by a first predetermined angle to continue moving forward when the second color information detected by the second sensor 7 is the color of the lane marking 200.

In block 710, the moving direction of the mobile warning triangle 100 is corrected to a second direction by a second predetermined angle to continue moving forward when the second color information detected by the second sensor 7 is not the color of the lane marking 200.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method of controlling a mobile warning triangle, wherein the mobile warning triangle comprising a first sensor and a second sensor, the method comprising:
   controlling the mobile warning triangle to move forward and acquiring first color information detected by the first sensor and second color information detected by the second sensor when the mobile warning triangle is placed on a lane and the first sensor detects a lane marking;
   determining whether the first color information detected by the first sensor is a color of the lane marking;
   controlling the mobile warning triangle to continue moving forward when the first color information detected by the first sensor is the color of the lane marking;
   determining whether the second color information detected by the second sensor is the color of the lane marking when the first color information detected by the first sensor is not the color of the lane marking; and
   correcting a moving direction of the mobile warning triangle to a first direction by a first predetermined angle to continue moving forward when the second color information detected by the second sensor is the color of the lane marking.

2. The method of claim 1, further comprising:
   correcting the moving direction of the mobile warning triangle to a second direction by a second predetermined angle to continue moving forward when the second color information detected by the second sensor is not the color of the lane marking; and
   wherein an included angle between the first direction and the second direction is 180 degrees.

3. The method of claim 2, further comprising:
   performing a direction correction of a reverse mode on the mobile warning triangle when the mobile warning triangle moves a predetermined distance and the first sensor fails to detect the lane marking again; and
   wherein, in the reverse mode, the current correction method of the mobile warning triangle is opposite to the last correction method.

4. The method of claim 1, further comprising:
   performing a direction correction of a reverse mode on the mobile warning triangle when the mobile warning triangle moves a predetermined distance and the first sensor fails to detect the lane marking again; and
   wherein, in the reverse mode, the current correction method of the mobile warning triangle is opposite to the last correction method.

5. The method of claim 1, wherein the mobile warning triangle further comprises a third sensor, the first sensor is arranged between the second sensor and the third sensor, the method further comprises:
   determining whether third color information detected by the third sensor is the color of the lane marking when the second color information detected by the second sensor is not the color of the lane marking;
   correcting a moving direction of the mobile warning triangle to a third direction by a third predetermined angle to continue moving forward when the third color information detected by the third sensor is the color of the lane marking; and
   wherein an included angle between the first direction and the third direction is 180 degrees.

6. The method of claim 5, further comprising:
   controlling the mobile warning triangle to continue moving a predetermined distance and determining whether the first sensor detects the lane marking again during the predetermined distance when the third color information detected by the third sensor is not the color of the lane marking; and controlling the mobile warning triangle to continue moving forward when the first sensor detects the lane marking again.

7. The method of claim 6, further comprising:
controlling the mobile warning triangle to stop moving when the first sensor fails to detect the lane marking again during the predetermined distance.

8. The method of claim 7, wherein the mobile warning triangle communicates with an application of an electronic device, the method further comprises:
controlling the mobile warning triangle or the application of the electronic device to output prompt information.

9. The method of claim 5, further comprising:
performing a direction correction of a reverse mode on the mobile warning triangle when the mobile warning triangle moves a predetermined distance and the first sensor fails to detect the lane marking again; and
wherein, in the reverse mode, the current correction method of the mobile warning triangle is opposite to the last correction method.

10. The method of claim 1, further comprising:
controlling the mobile warning triangle to stop moving when a moving distance of the mobile warning triangle is equal to a predetermined moving distance.

11. A mobile warning triangle comprising:
a warning triangle;
at least two wheels;
a first sensor;
a second sensor;
at least one processor; and
a storage device storing one or more programs which when executed by the at least one processor, causes the at least one processor to:
control the mobile warning triangle to move forward and acquire first color information detected by the first sensor and second color information detected by the second sensor when the mobile warning triangle is placed on a lane and the first sensor detects a lane marking;
determine whether the first color information detected by the first sensor is a color of the lane marking;
control the mobile warning triangle to continue moving forward when the first color information detected by the first sensor is the color of the lane marking;
determine whether the second color information detected by the second sensor is the color of the lane marking when the first color information detected by the first sensor is not the color of the lane marking; and
correct a moving direction of the mobile warning triangle to a first direction by a first predetermined angle to continue moving forward when the second color information detected by the second sensor is the color of the lane marking.

12. The mobile warning triangle of claim 11, wherein the at least one processor is further to:
correct the moving direction of the mobile warning triangle to a second direction by a second predetermined angle to continue moving forward when the second color information detected by the second sensor is not the color of the lane marking; and
wherein an included angle between the first direction and the second direction is 180 degrees.

13. The mobile warning triangle of claim 12, wherein the at least one processor is further to:
perform a direction correction of a reverse mode on the mobile warning triangle when the mobile warning triangle moves a predetermined distance and the first sensor fails to detect the lane marking again; and
wherein, in the reverse mode, the current correction method of the mobile warning triangle is opposite to the last correction method.

14. The mobile warning triangle of claim 11, wherein the at least one processor is further to:
perform a direction correction of a reverse mode on the mobile warning triangle when the mobile warning triangle moves a predetermined distance and the first sensor fails to detect the lane marking again; and
wherein, in the reverse mode, the current correction method of the mobile warning triangle is opposite to the last correction method.

15. The mobile warning triangle of claim 11, wherein the mobile warning triangle further comprises a third sensor, the first sensor is arranged between the second sensor and the third sensor, the at least one processor is further to:
determine whether third color information detected by the third sensor is the color of the lane marking when the second color information detected by the second sensor is not the color of the lane marking;
correct a moving direction of the mobile warning triangle to a third direction by a third predetermined angle to continue moving forward when the third color information detected by the third sensor is the color of the lane marking; and
wherein an included angle between the first direction and the third direction is 180 degrees.

16. The mobile warning triangle of claim 15, wherein the at least one processor is further to:
control the mobile warning triangle to continue moving a predetermined distance and determine whether the first sensor detects the lane marking again during the predetermined distance when the third color information detected by the third sensor is not the color of the lane marking; and
control the mobile warning triangle to continue moving forward when the first sensor detects the lane marking again.

17. The mobile warning triangle of claim 15, wherein the at least one processor is further to:
control the mobile warning triangle to stop moving when the first sensor fails to detect the lane marking again during the predetermined distance.

18. The mobile warning triangle of claim 17, wherein the mobile warning triangle communicates with an application of an electronic device, the at least one processor is further to:
control the mobile warning triangle or the application of the electronic device to output prompt information.

19. The mobile warning triangle of claim 15, wherein the at least one processor is further to:
perform a direction correction of a reverse mode on the mobile warning triangle when the mobile warning triangle moves a predetermined distance and the first sensor fails to detect the lane marking again; and
wherein, in the reverse mode, the current correction method of the mobile warning triangle is opposite to the last correction method.

20. The mobile warning triangle of claim 15, wherein the at least one processor is further to:
control the mobile warning triangle to stop moving when a moving distance of the mobile warning triangle is equal to a predetermined moving distance.

\* \* \* \* \*